(12) United States Patent
Theocharous et al.

(10) Patent No.: US 11,615,293 B2
(45) Date of Patent: Mar. 28, 2023

(54) REINFORCEMENT LEARNING WITH A STOCHASTIC ACTION SET

(71) Applicant: ADOBE INC., San Jose, CA (US)

(72) Inventors: Georgios Theocharous, San Jose, CA (US); Yash Chandak, Amherst, MA (US)

(73) Assignee: ADOBE INC., San Jose, CA (US)

( * ) Notice: Subject to any disclaimer, the term of this patent is extended or adjusted under 35 U.S.C. 154(b) by 824 days.

(21) Appl. No.: 16/578,863

(22) Filed: Sep. 23, 2019

(65) Prior Publication Data

US 2021/0089868 A1 Mar. 25, 2021

(51) Int. Cl.
*G06N 3/04* (2006.01)
*G06N 3/08* (2006.01)

(52) U.S. Cl.
CPC ............ *G06N 3/0472* (2013.01); *G06N 3/08* (2013.01)

(58) Field of Classification Search
CPC ............................. G06N 3/0472; G06N 3/08
See application file for complete search history.

(56) References Cited

U.S. PATENT DOCUMENTS

| | | | |
|---|---|---|---|
| 2009/0271340 A1* | 10/2009 | Schneegass | G05B 13/0265 706/47 |
| 2017/0323195 A1* | 11/2017 | Crawford | G06N 20/00 |
| 2019/0291728 A1* | 9/2019 | Shalev-Shwartz | B60W 30/18154 |
| 2021/0117786 A1* | 4/2021 | Schwarz | G06N 3/084 |
| 2021/0237266 A1* | 8/2021 | Kalashnikov | B25J 9/1697 |
| 2021/0357731 A1* | 11/2021 | Van de Wiele | G06N 3/0454 |
| 2022/0076099 A1* | 3/2022 | Sermanet | G06N 3/0454 |

OTHER PUBLICATIONS

Neyman, Abraham. "From Markov chains to stochastic games." Stochastic games and applications. Springer, Dordrecht, 2003. 9-25. (Year: 2003).*

Niese, Nathan D., Austin A. Kana, and David J. Singer. "Ship design evaluation subject to carbon emission policymaking using a Markov decision process framework." Ocean Engineering 106 (2015): 371-385. (Year: 2015).*

Ferreira, Leonardo A., et al. "Answer set programming for non-stationary markov decision processes." Applied Intelligence 47.4 (2017): 993-1007. (Year: 2017).*

Papini, Matteo, et al. "Stochastic variance-reduced policy gradient." International conference on machine learning. PMLR, 2018. (Year: 2018).*

(Continued)

*Primary Examiner* — Hal Schnee
(74) *Attorney, Agent, or Firm* — F. Chau & Associates, LLC

(57) ABSTRACT

Systems and methods are described for a decision-making process including actions characterized by stochastic availability, provide an Markov decision process (MDP) model that includes a stochastic action set based on the decision-making process, compute a policy function for the MDP model using a policy gradient based at least in part on a function representing the stochasticity of the stochastic action set, identify a probability distribution for one or more actions available at a time period using the policy function, and select an action for the time period based on the probability distribution.

18 Claims, 10 Drawing Sheets

(56) References Cited

OTHER PUBLICATIONS

Du, Simon S., et al. "Stochastic variance reduction methods for policy evaluation." International Conference on Machine Learning. PMLR, 2017. (Year: 2017).*
Chou, Po-Wei, Daniel Maturana, and Sebastian Scherer. "Improving stochastic policy gradients in continuous control with deep reinforcement learning using the beta distribution." International conference on machine learning. PMLR, 2017. (Year: 2017).*
Boutiller, et al., "Planning and Learning with Stochastic Action Sets", arXiv:1805.02363v1 [cs.AI] May 7, 2018, pp. 1-18.

* cited by examiner

Algorithm 1: Stochastic Action Set Policy Gradient (SAS-PG)

1: $A = [\lambda_1, \lambda_2]^T = [-0.5, -0.5]^T$ ▷ Initialize $\lambda$'s
2: for $episode = 0, 1, 2, \ldots$ do
3:     # Collect transition batch using $\pi^\theta$
4:     $B = \{(s_0, \alpha_0, a_0, r_0), \ldots, (s_T, \alpha_T, a_T, r_T)\}$
    $G(s_t) = \sum_{k=0}^{T-t} \gamma^k r_{t+k}$
5:     # Perform update on parameters using batch $B$
6:     $\psi^\theta(s, \alpha, a) = \frac{\partial \log \pi^\theta(s, \alpha, a)}{\partial \theta} - \frac{\partial \log \pi^\theta(s, \alpha, a)}{\partial \theta}$
7:     $\varpi \leftarrow \varpi + \eta_{\varpi}(G(s) - \hat{q}^\varpi(s)) \frac{\partial \hat{q}^\varpi(s)}{\partial \varpi}$   ▷ Update $\hat{q}^\varpi$
8:     $\omega \leftarrow \omega + \eta_{\omega}(G(s) - \hat{q}^\omega(s, a)) \frac{\partial \hat{q}^\omega(s, a)}{\partial \omega}$   ▷ Update $\hat{q}^\omega$
9:     $\theta \leftarrow \theta + \eta_{\theta}(G(s) + \lambda_1 \hat{q}^\omega(s) + \lambda_2 \hat{q}^\omega(s, a))\psi^\theta(s, \alpha, a)$   ▷ Update $\pi^\theta$
10:     # Automatically tune hyper-parameters for variance reduction using $B$
11:     $B = [\psi^\theta(s, \alpha, a)\hat{q}^\varpi(s), \psi^\theta(s, \alpha, a)\hat{q}^\omega(s, a)]^T$
    $C = [\psi^\theta(s, \alpha, a)G(s)]^T$
12:     $\hat{A} \leftarrow -(E[B^T B])^{-1} E[B^T C]$
13:     $A \leftarrow \eta_\lambda \hat{A} + (1 - \eta_\lambda)A$   ▷ Update $\lambda$'s

FIG. 9

Algorithm 2: Stochastic Action Set Natural Policy Gradient (SAS-NPG)

1: for $episode = 0, 1, 2, \ldots$ do
2:     # Collect transition batch using $\pi^\theta$
     $B = \{(s_0, \alpha_0, a_0, r_0), \ldots, (s_T, \alpha_T, a_T, r_T)\}$
3:     $\hat{G}(s_t) = \sum_{k=0}^{T-t} \gamma^k r_{t+k}$
     # Perform batch update on parameters
4:     $\psi^\theta(s, \alpha, a) = \frac{\partial \log \pi^\theta(s, \alpha, a)}{\partial \theta}$
5:     $w \leftarrow w + \eta_w (\hat{G}(s) - \psi^\theta(s, \alpha, a)^\top w) \psi^\theta(s, \alpha, a)$    ▷ Update $w$
6:     $\theta \leftarrow \theta + \eta_\theta \frac{w}{\sqrt{w^\top w}}$    ▷ Update $\pi^\theta$

FIG. 10

REINFORCEMENT LEARNING WITH A STOCHASTIC ACTION SET

Embodiments of the present disclosure generally relate to real-world sequential decision-making and, more particularly, to a decision-making formulation where the action set can be stochastic.

A Markov decision process (MDP) is a discrete-time stochastic control process that can be useful in making many real-world decisions. For example, an MDP may be used to model a decision-making problem such as selecting vehicular routing on a road network, with the end goal of finding the shortest path between a source and destination. A conventional MDP postulates the existence of a static set of choices, such as the option to turn the vehicle in various directions at an intersection.

However, in many real-world decision-making-problems, not all actions are available at every point in time. Furthermore, the availability of actions at any given time may not be a deterministic function of observable conditions. In the vehicular routing example, variables such as construction, traffic, or car accidents limit the pathways available. Thus, using an MDP that assumes a static action set may result in recommended actions that are not consistent with existing circumstances, which can limit the usability of the decision-making process.

SUMMARY

A method, apparatus, and non-transitory computer-readable medium for reinforcement learning with stochastic availability are described. Embodiments of the method, apparatus, and non-transitory computer-readable medium may identify a decision-making process including actions characterized by stochastic availability, provide an Markov decision process (MDP) model that includes a stochastic action set based on the decision-making process, compute a policy function for the MDP model using a policy gradient based at least in part on a function representing a stochasticity of the stochastic action set, identify a probability distribution for one or more actions available at a time period using the policy function, and select an action for the time period based on the probability distribution.

Another method, apparatus, and non-transitory computer-readable medium for reinforcement learning with stochastic availability are described. Embodiments of the method, apparatus, and non-transitory computer-readable medium may compute a policy function for an MDP model using a policy gradient based at least in part on a function representing a stochasticity of a stochastic action set; receive a first available action set for the MDP for a first time period; select a first action set for the first time period using the policy function based on the first available action set; receive a second available action set for the MDP for a second time period, wherein the second available action is not equal to the first available action set; and select a second action for the second time period using the policy function based on the second available action set.

Another method, apparatus, and non-transitory computer-readable medium for reinforcement learning with stochastic availability are described. Embodiments of the method, apparatus, and non-transitory computer-readable medium may provide an MDP model that includes a stochastic action set; perform adaptive variance mitigation using a first value function that is independent of a stochastic availability of the stochastic action set and a second value function that is dependent on the stochastic availability; compute an unbiased estimate of a policy gradient based on the adaptive variance mitigation; compute a policy function based on the unbiased estimate of the policy gradient; and select an action based on the policy function.

BRIEF DESCRIPTION OF THE DRAWINGS

FIG. 9 shows an example of a stochastic action set policy gradient (SAS-PG) algorithm.

FIG. 10 shows an example of a stochastic action set natural policy gradient (SAS-NPG) algorithm.

DETAILED DESCRIPTION

Figure 1:
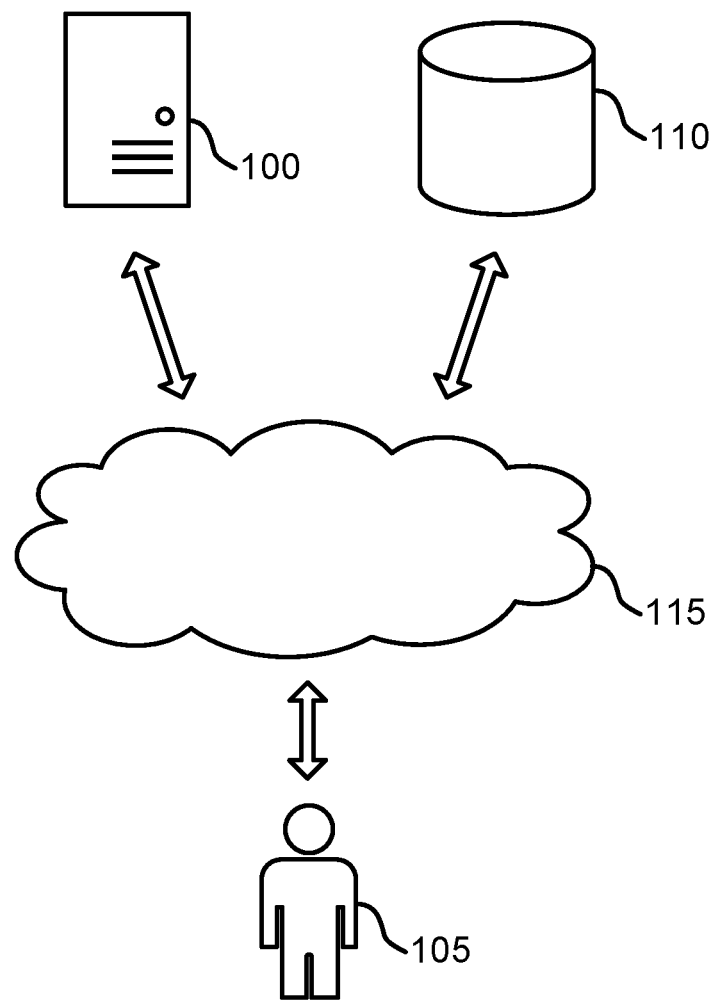
FIG. 1 shows an example of a sequential decision-making system according to aspects of the present disclosure.

The present disclosure provides systems and methods for sequential decision-making with a stochastic action set. Conventionally, many decision-making problems have been modeled using a Markov decision process (MDP). An MDP is particularly useful when outcomes are partly random and partly under the control of a decision maker. The MDP formulation is flexible enough to incorporate concepts like stochastic state transitions, partial observability, and even deterministic action availability depending on the state. However, the conventional MDP formulation does not account for stochastic action sets.

In many real-world decision-making-problems, not all actions are available at every point in time. Furthermore, the availability of actions at any given time may not be a deterministic function of observable conditions. For example, in vehicular routing, variables such as construction, traffic, or car accidents limit the pathways available at each decision point. That is, an MDP model of vehicular routing that does not properly take into account stochastic availability may recommend a route that passes through a street that is closed for construction. Alternatively, the route may not be optimized based on the possibility that streets may be closed for construction. Thus, using a conventional MDP when actions are available only probabilistically may result in reduced decision-making accuracy. Furthermore, previous attempts to incorporate stochastic action sets have resulted in divergent models that are unsuitable for real-world applications (i.e., they can result in meaningless recommendations).

Accordingly, embodiments of the present disclosure provide an MDP model of a decision-making process that includes actions characterized by stochastic availability. A policy function is computed for the MDP model using a policy gradient based at least in part on a function representing the stochasticity of the action set. The policy function may be used to identify a probability distribution for choosing actions available at a particular time, and an action may be selected based on the probability distribution.

By using a policy gradient that takes the stochasticity of the action set into account, the systems and methods described herein provide meaningful decision-making ability in real-world circumstances where the action set is not deterministic. For example, vehicle routing systems may be more efficient if they include a probabilistic model of route availability. Similarly, making control inputs based on stochastic availability of the movements can result in more efficient and accurate task performance.

In another example, taking stochastic availability into account may result in a more effective advertisement strategy. In yet another example, product recommendations may be more effective if they take into account the fact that products are not always available. In each of these examples, a conventional MDP model would fail to provide suitable results, whereas embodiments of the present disclosure enable efficient selection and planning based on currently available actions.

The following terms are used throughout the present disclosure.

A Markov decision process (MDP) is a framework for modeling decision making in situations where outcomes are partially under the control of a decision maker (the agent). Decisions are made by selecting an action based on a current state. The selected action impacts the future state (along with other random factors), which in turn impacts future decisions. Examples of decision making processes that can be modeled with an MDP include vehicle route planning, advertisement selection, robot control, and product recommendation.

An action set refers to the set of actions that are available to an agent at any given time in an MDP. Traditional MDP models assume that each action in the action set is available at all times, or that the availability depends on the state in a deterministic way. However, in many cases, some actions may not always be available, and the availability may not depend on the state.

Stochastic availability refers to the probabilistic availability of actions in an action set. A "stochastic" system depends on a past state and random variation. In the present disclosure, the actions available in the action set of the MDP change randomly over time, but the available actions at any given time belong to the overall set of actions.

For example, in vehicle route planning, the stochastic availability may be based on random routing availability. In an advertisement context, the availability of ads may be stochastic. In the context of a robot control mechanism, actuator movement availability may be probabilistic (e.g., if an actuator is not functioning properly). In a product recommendation context, product availability may be at least partially random.

A policy function refers to the function of an MDP that takes the current state as input and outputs an action (or a probability distribution over a set of actions). In other words, the policy function determines what decision the agent should make at any given time. Typically, an agent seeks to find the optimal policy function that maximizes some objective function over time. For example, in the vehicle routing example, it may be desirable to select a policy function that results in the shortest path to a destination. In the advertisement or product recommendation example, a policy function may be selected to maximize revenue from sales. In the robot control example, a policy function may be selected that minimizes the time it takes to successfully perform a task.

A policy gradient refers to the gradient of the objective function with respect to a parameterization of the policy function. In other words, the policy function may be written in a form that depends on one or more parameters, and the policy gradient represents how the overall objective is impacted when the parameters are changed. In some cases, the policy function is implemented as a neural network, and the parameters correspond to node weights of the network.

Adaptive variance mitigation refers to a process for reducing the variance of policy function estimates when optimizing the policy gradient. Variance mitigation may utilize on one or more baseline functions (or value functions), which account for and effectively remove the influence of past actions. This can result in more consistent estimates of the policy function. The present disclosure describes a baseline function for variance mitigation that reflects the stochasticity of the action set.

FIG. 1 shows an example of a sequential decision-making system according to aspects of the present disclosure. The example shown includes server 100, agent 105, action source 110, and network 115. Server 100, and agent 105, and action source 110 may communicate with each other via the network 115. Specifically, server 100 may provide sequential action recommendations to agent 105 based on a changing action set provided by action source 110. In some cases, the action source 110 or another data source may provide information related to the state of the system. Server 100 may be an example of, or include aspects of, the corresponding element or elements described with reference to FIG. 8.

In an example embodiment, server 100 provides vehicle routing recommendation to, agent 105 (e.g., a vehicle navigation system) and action source 110 provides information related to paths in the road network, which may not be available at certain times. In one example of this embodiment, a neural network within or connected to server 100 may be trained by receiving a positive "reward" when the agent reaches the desired destination, while a small penalty is applied at every time step otherwise.

In another example embodiment, server 100 provides robot locomotion instructions. During training, a penalty may be applied at each time step to encourage the agent 105 (i.e., the robot) to reach the goal as quickly as possible. The action source 110 may indicate which of the robot's actuators are functioning at any particular time. That is, each actuator may be unreliable and is therefore only available with some fixed probability.

In a product recommender system, server 100 may provide online product recommendations. Due to various factors such as stock outage, promotions, delivery issues, etc., not all products can be recommended at all times. The goal of the recommender system is to suggest products that maximize total profit.

Conventionally, sequential decision-making problems without stochastic action sets are modeled as MDPs. A policy function may be computed for an MDP using algorithms such as value iteration or Q-learning, a well-known model-free reinforcement learning algorithm. The term "model-free" indicates that this method does not depend on having a model of the environment. Rather statistical sampling may be used to select the policy.

Although the MDP formulation is flexible, it does not allow for stochastic action sets. Thus, some systems may utilize a Stochastic Action Set (SAS) Markov Decision Processes (SAS-MDP). However, problems caused by the lack of a convergence guarantee for Q-learning are exacerbated by the presence of a stochastic action set. Furthermore, since the introduction of stochastic action sets introduces further uncertainty in the decision-making process, variance reduction techniques are of increased importance.

Formally, an MDP is a tuple $\mathcal{M} = (\mathcal{S}; \mathcal{E}; \mathcal{P}; \mathcal{R}; \gamma; d0)$. $\mathcal{S}$ is the set of all possible states that the agent 105 can be in, called the state set. Although the math notation implies that S is countable, the primary results extend to MDPs with continuous states. $\mathcal{E}$ is a finite set of all possible actions that the agent can take, called the base action set. St and At are random variables that denote the state of the environment and action chosen by the agent at time $t \in \{0, 1, \ldots\}$. $\mathcal{P}$ is called the transition function and characterizes how states transition: $\mathcal{P}(s, a, s') := P_r(S_{t+1}=s'|S_t=s, A_t=a)$. $R_t \in [-R_{max}, R_{max}]$, a bounded random variable, is the scalar reward received by the agent at time t, where $R_{max}$ is a finite constant. $\mathcal{R}$ is called the reward function and is defined as $\mathcal{R}(s, a) := E[R_t|S_t=s, A_t=a]$ The reward discount parameter, $\gamma \in [0, 1)$ characterizes how the utility of rewards to the agent decays based on how far in the future they occur. Finally, d0 is the start state distribution, which is defined as $d0(s) := P_r(S_0=s)$.

The set of actions available at time t is a random variable, $\mathcal{A}_t \subseteq \mathcal{E}$ which is assumed not to be empty, i.e., $\mathcal{A}_t \neq \emptyset$. The function $\varphi$ (i.e., the stochasticity function) characterizes the conditional distribution of $\mathcal{A}_t$: $\varphi(s, \alpha) := P_r(\mathcal{A}_t = \alpha | S_t = s)$. $\mathcal{A}_t$ may be Markovian, in that its distribution is conditionally independent of all events before the agent entering state $S_t$. Formally, an SAS-MDP is given by $\mathcal{M}' = \{\mathcal{M} \cup \varphi\}$, with the additional requirement that $A_t \in \mathcal{A}_t$ A policy $\pi: \mathcal{S} \times 2^{\mathcal{E}} \times \mathcal{E} \to [0, 1]$ is a conditional distribution over actions for each state: $\pi(s, \alpha, a) := Pr(A_t=a|S_t=s, A_t=\alpha)$ for all $s \in \mathcal{S}$, $a \in \alpha$, $\alpha \subseteq \mathcal{E}$, and t, where $\alpha \neq \emptyset$. A policy may be parameterized by a weight vector $\theta$, where changing $\theta$ changes the policy. A parameterized policy, $\pi^\theta$, represents a policy with a weight vector $\theta$. For any policy $\pi$, the corresponding state-action value function may be written as $q^\pi(s, a) := \mathbb{E}[\sum_{k=0}^\infty \gamma^k R_{t+k} | S_t=s, A_t=a, \pi]$, where conditioning on $\pi$ denotes that $A_{t+k} \sim \pi(S_{t+k}, A_{t+k}, \cdot)$ for all $A_{t+k}$ and $S_{t+k}$ for $k \in [t+1, \infty)$.

Similarly, the state-value function associated with policy $\pi$ is given by $v^\pi(s) := \mathbb{E}[\sum_{k=0}^\infty \gamma^k R_{t+k} | S_t=s, \pi]$. For a given SAS-MDP $\mathcal{M}'$, the agent seeks to find an optimal policy, $\pi^*$, (or equivalently optimal policy parameters $\theta^*$) which is any policy that maximizes the expected sum of discounted future rewards. More formally, an optimal policy is any $\pi^* \in \operatorname{argmax}_{\pi \in \Pi} J(\pi)$, where $J(\pi) := \mathbb{E}[\sum_{t=0}^\infty \gamma^t R_t | \pi]$ and $\Pi$ denotes the set of all possible policies. For notational convenience, $\theta$ may be used in place of $\pi$, e.g., to write $v^\theta$, $q^\theta$, or $J(\theta)$, since a weight vector $\theta$ induces a specific policy.

In some cases, $\mathcal{A}_t$ may be inferred given $S_t$. Transforming an MDP into a new MDP with $\mathcal{A}_t$ embedded in $S_t$ in this way can result in the size of the state set growing exponentially by a factor of $2^{|\mathcal{E}|}$. This drastic increase in the size of the state set can make finding or approximating an optimal policy prohibitively difficult. However, using the SAS-MDP formulation, the challenges associated with this exponential increase in the size of the state set can be avoided. In some cases, an algorithm may be used to find or approximate optimal policies in terms of the state set of the underlying MDP. For example, this may be accomplished using a variant of the Bellman operator, T, which incorporates the concept of stochastic action sets:

$$\mathcal{T}^\pi v(s) = \Sigma_{\alpha \in 2^{\mathcal{B}}} \varphi(s,\alpha) \Sigma_{a \in \alpha} \pi(s,\alpha,a)$$
$$\Sigma_{s' \in \mathcal{S}} P(s,\alpha,s')(R(s,a)+\gamma v(s')) \quad \text{(Eq. 1)}$$

for all $s \in \mathcal{S}$. Similarly, one can extend the Bellman optimality operator:

$$\mathcal{T}^*(s) = \sum_{\alpha \in 2^{\mathcal{B}}} \varphi(s, \alpha) \max_{a \in \alpha} \sum_{s' \in \mathcal{S}} P(s, \alpha, s')(R(s, a) + \gamma v(s')). \quad \text{(Eq. 2)}$$

A tabular estimate q, of $q^{\pi^*}$ shows an equivalence between the fixed point of this modified Bellman operator and the fixed point of the standard Bellman operator on the MDP with embedded actions:

$$q(S_t, A_t) \leftarrow (1-\eta)q(S_t, A_t) + \eta\left(R_t + \gamma \max_{\alpha \in A_{t+1}} q(S_{t+1}, q)\right) \quad \text{(Eq. 3)}$$

The maximum is computed over the available actions, $A_{t+1}$, in state $S_{t+1}$. An algorithm using this updated model is known as SAS-Q-learning. Although SAS-Q-learning provides a model-free algorithm for approximating optimal policies for SAS-MDPs, it inherits several of the drawbacks of the Q-learning algorithm for MDPs. Like Q-learning in a state $S_t$ with available actions $A_t$, the SAS-Q-learning method chooses actions deterministically when not exploring: $A_t \in \operatorname{argmax}_{a \in A_t} q(S_t, a)$.

Thus, the practicality of SAS-Q-learning is limited for problems where optimal policies are stochastic, which is often the case when the environment is partially observable or when the use of function approximation causes state aliasing. Additionally, if the SAS-Q-learning update converges to an estimate, q, of $q^{\pi^*}$ such that $\mathcal{T} v(s) = v(s)$ for all $s \in \mathcal{S}$, then the agent acts optimally; however, convergence to a fixed-point of $\mathcal{T}$ is seldom achieved in practice and reducing the difference between v(s) and $\mathcal{T} v(s)$ (what SAS-Q-learning aims to do) does not ensure improvement of the policy.

SAS-Q-learning does not perform gradient ascent or descent on any function, and it can cause divergence of the estimator q when using function approximation, just like Q-learning for MDPs. Furthermore, the divergent behavior of SAS-Q-Learning can, in some cases, be more severe than that of the Q-Learning algorithm for MDPs. That is, in cases where Q-learning converges, SAS-Q-learning can diverge.

For example, consider the SAS variant of the classical $\theta \to 2\theta$ MDP. In this example there are two states, $s_1$ and $s_2$, and two actions, $a_1$=left and $a_2$=right. The agent in this example uses function approximation, with weight vector $\theta \in \mathbb{R}^2$, such that $q(s_1, a_1)=\theta_1$, $q(s_2, a_1)=2\theta_1$ and $q(s_1, a_2)=\theta_2$, $q(s_2, a_1)=2\theta_2$. In either state, if the agent takes the left action, it goes to the left state, and if the agent takes the right action, it goes to the right state. In our SAS-MDP version of this problem, both actions are not always available. Let $R_t=0$ always, and $\gamma=1$. The weights of the q-approximation may be initialized to $\theta=[0, -1]$.

If a transition is observed from the left state to the right state, and after the transition the left action is not available to the agent. As per the SAS-Q-learning update rule provided in, $\theta_2 \leftarrow \theta_2 + \eta(r + \gamma 2\theta_2 - \theta_2)$. Since r=0 and $\gamma=1$, this is equivalent to $\theta_2 \leftarrow \theta_2 + \eta\theta_2$. If this transition is used repeatedly on its own, then irrespective of the learning rate, $\eta > 0$, the weight $\theta$ would diverge to $-\infty$. In contrast, had there been no constraint of using max over q given the available actions, the Q-learning update would have been, $\theta_2 \leftarrow \theta_2 + \eta(r + \gamma 2\theta_1 - \theta_2)$ because action $a_1$ has higher q-value than $a_1$ due to $\theta_1 > \theta_2$. In this case, $\theta_2$ would converge to the correct value of 0. Thus, the stochastic constraints on the available actions can be instrumental in causing the SAS-Q-learning method to diverge.

Thus, according to embodiments of the present disclosure, a policy gradient is used for an SAS-MDP. While the Q-learning algorithm minimizes the error between $\mathcal{T} v(s) = v(s)$ for all states s (using a procedure that is not a gradient algorithm), policy gradient algorithms perform stochastic gradient ascent on the objective function J. That is, they use the update $\theta_2 \leftarrow \theta_2 + \eta \Delta$, where $\Delta$ is an unbiased estimator of $\nabla J(\theta)$. According to embodiments of the present disclosure, a policy gradient algorithm for MDPs provides local convergence even when using function approximation.

The SAS policy gradient may be defined for an SAS-MDP, for all $s \in \mathcal{S}$, by:

$$\nabla J(\theta) = \sum_{t=0}^{\infty} \sum_{s \in S} \gamma^t Pr(S_t = s \mid \theta) \sum_{a \in 2^{\mathcal{B}}} \varphi(s, \alpha) \sum_{a \in \alpha} q^{\theta}(s, a) \frac{\partial \pi^{\theta}(s, \alpha, a)}{\partial \theta} \quad \text{(Eq. 4)}$$

It follows from Eq. 4 that an unbiased estimate of $\nabla J(\theta)$ can be created, which can be used to update $\theta$ using the well-known stochastic gradient ascent algorithm. The process for creating an unbiased estimator is described in further detail with reference to FIG. 7.

The policy gradient does not depend on knowing the function $\varphi$. Furthermore, it converges to locally optimal policies when the policy is differentiable, the gradient of J is Lipschitz, and step-sizes are decayed.

The SAS policy gradient algorithm causes $\nabla J(\theta_t) \rightarrow 0$ as $t \rightarrow \infty$, with probability one. Natural policy gradient algorithms extend policy gradient algorithms to follow the natural gradient of J. Whereas policy gradient methods perform gradient ascent in the space of policy parameters by computing the gradient of J as a function of the parameters $\theta$, natural policy gradient methods perform gradient ascent in the space of policies (which are probability distributions) by computing the gradient of J as a function of the policy, $\pi$.

Thus, whereas the policy gradient implicitly measures distances between policies by the Euclidean distance between their policy parameters, natural policy gradient methods measure distances between policies using notions of distance between probability distributions. In one example of a natural policy gradient, the distances between policies are measured using a Taylor approximation of Kullback-Leibler divergence (KLD). By performing gradient ascent in the space of policies rather than the space of policy parameters, the natural policy gradient becomes invariant to how the policy is parameterized, which can mitigate the vanishing gradient problem in neural networks and improve learning speed.

The natural policy gradient (using a Taylor approximation of KLD to measure distances) is $\tilde{\nabla} J(\theta) := F_{\theta}^{-1} \nabla J(\theta)$ where $F_{\theta}$ is the Fisher information matrix (FIM) associated with the policy $\pi_{\theta}$. Although a well-known quantity, the FIM is typically associated with a parameterized probability distribution. Here, $\pi_{\theta}$ is a collection of probability distributions-one per state. which raises the question of what $F_{\theta}$ should be when computing the natural policy gradient. The FIM, $F_{\theta}$, for computing the natural policy gradient for a SAS-MDP can also be derived by viewing $\pi_{\theta}$ as a single distribution over possible trajectories (sequences of states, available action sets, and executed actions).

For a policy parameterized using weights $\theta$, the Fisher information matrix is given by:

$$F_{\theta} = \Sigma_{t=0}^{\infty} \Sigma s \in \mathcal{S} \, \gamma^t Pr(S_t = s \mid \theta) \Sigma_{\alpha \in 2^{\mathcal{B}}} \varphi(s, \alpha) \times \Sigma_{a \in \alpha} \pi^{\theta} (s, \alpha, a) \psi^{\theta}(s, \alpha, a) \psi^{\theta}(s, \alpha, a)^T, \quad \text{(Eq. 5)}$$

where $\psi^{\theta}(s, \alpha, a) := \partial \log \pi^{\theta}(s, \alpha, a) / \partial \theta$.

Several terms in the definition of the natural policy gradient cancel, providing a simple expression for the natural gradient, which can be estimated with time linear in the number of policy parameters per time step. Thus, if w is a parameter such that:

$$\frac{\partial}{\partial \omega} \mathbb{E}\left[\frac{1}{2} \sum_{t}^{\infty} \gamma^t \left(\psi^{\theta}(S_t, \mathcal{A}_t, A_t)^T \omega - q^{\theta}(S_t, A_t)\right)^2\right] = 0, \quad \text{(Eq. 6)}$$

then for all $s \in \mathcal{S}$ in $\mathcal{M}'$, $\tilde{\nabla} J(\theta) = \mathcal{M}$.

Using the result of Eq. 6, a computationally efficient natural policy gradient algorithm may be derived using a temporal difference algorithm, modified to work with SAS-MDPs, to estimate $q^{\theta}$ with the approximator $\psi^{\theta}(S_t, \mathcal{A}_t, A_t)^T \omega$, and then using the update $\theta \leftarrow \theta + \eta \omega$.

Figure 2:
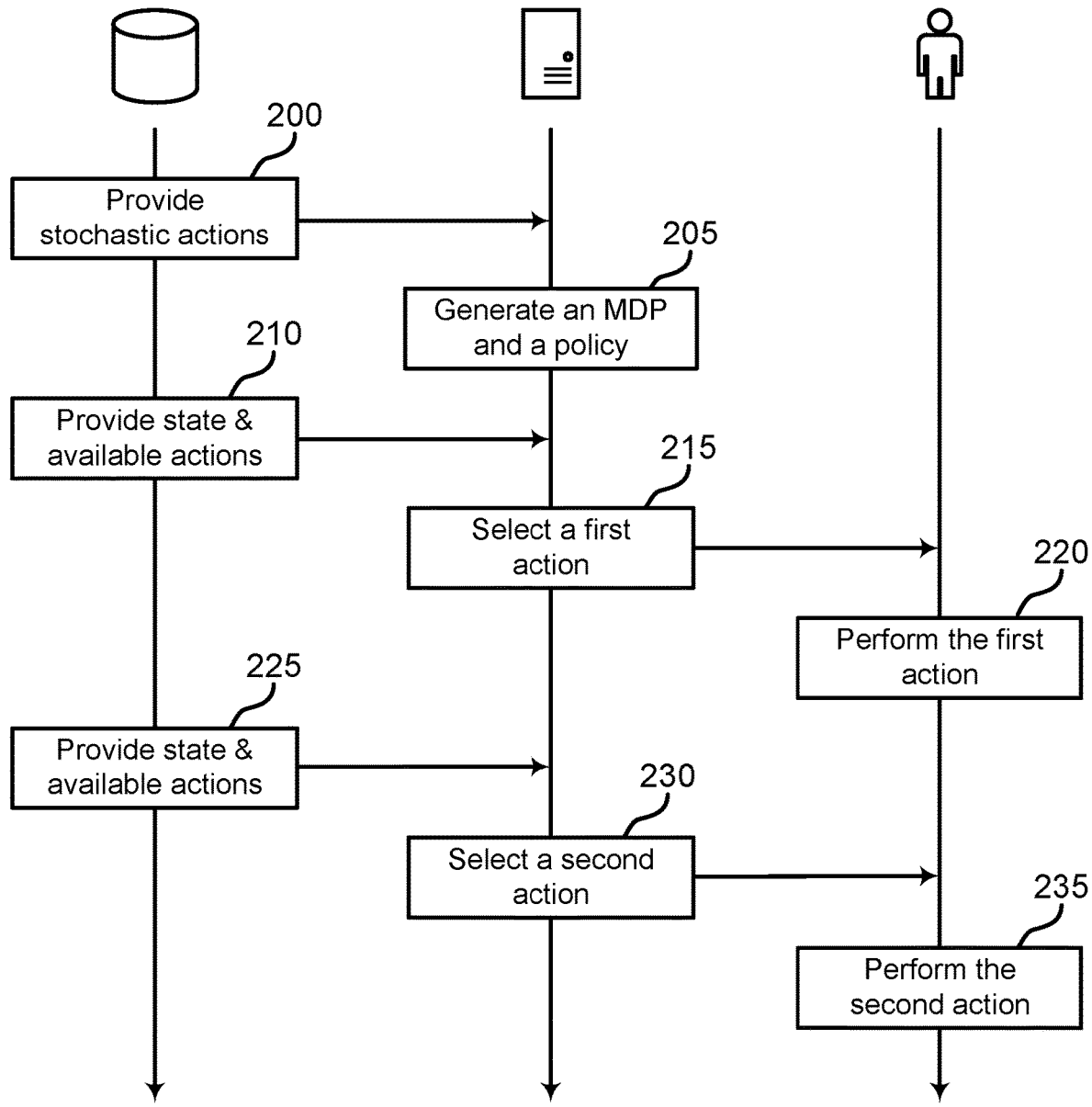
FIG. 2 shows an example of a decision-making process with stochastic availability according to aspects of the present disclosure.

FIG. 2 shows an example of a decision-making process with stochastic availability according to aspects of the present disclosure. FIG. 2 illustrates how a sequential decision-making system such as that described with reference to FIG. 1 may provide action recommendations that lead to actions performed by an agent.

At operation 200, the action source of the sequential decision-making system provides information regarding a stochastic set of actions. Then, at operation 205, the system generates an SAS-MDP model based on the stochastic action set, including a policy computed using a policy gradient as described above.

At operation 210 the system receives a first state (e.g., the position of a vehicle) and a first set of available actions (e.g., the paths that are available at each intersection) at the first time. In other words, at a given time, some of the actions in the stochastic action set are not available. Thus, in addition to receiving state input, the system receives information regarding which actions are available. At operation 215, the system selects a first action from the first set of available actions based on the policy (e.g., recommending a path for the vehicle to take at a particular intersection). At operation 220, the agent performs the first action at the first time (e.g., the vehicle may turn at an intersection to take the recommended path).

At operation 225, the system receives a second state and a second set of available actions at a second time. For example, at the second time, the position of the vehicle may have changed, and some of the previously available paths may be closed. At operation 230, the system selects a second action from the second set of available actions based on the policy. At operation 235, the agent performs the second action at the second time (e.g., the vehicle may turn to select another path if the path it is on is blocked).

Figure 3:
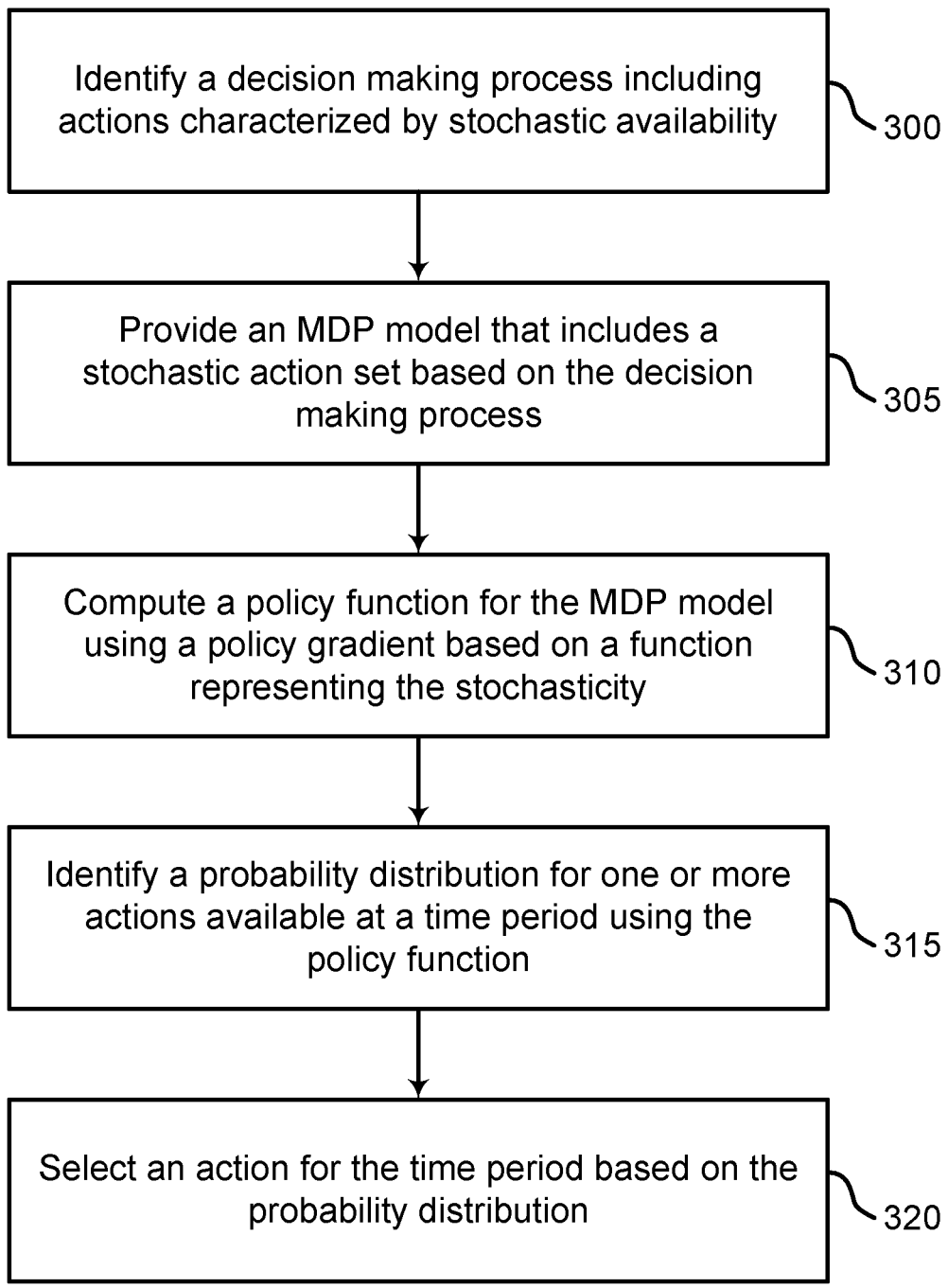
FIG. 3 shows an example of a process for reinforcement learning with stochastic availability according to aspects of the present disclosure.

FIG. 3 shows an example of a process for reinforcement learning with stochastic availability according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described according to aspects of the present disclosure. For example, the operations may be composed of various substeps, or may be performed in conjunction with other operations described herein.

At operation 300, the system identifies a decision-making process including actions characterized by stochastic availability. In some cases, the operations of this step may be performed by an MDP component as described with reference to FIG. 8. At operation 305, the system provides an MDP model that includes a stochastic action set based on the decision-making process. In some cases, the operations of this step may be performed by an MDP component as described with reference to FIG. 8. Further detail regarding generating the decision-making process and the corresponding MDP model is provided with reference to FIG. 4.

At operation 310, the system computes a policy function for the MDP model using a policy gradient based on a function representing a stochasticity of the stochastic action set. In some cases, the operations of this step may be performed by a policy component as described with reference to FIG. 8. Further detail regarding computing a policy function is provided with reference to FIG. 5.

At operation 315, the system identifies a probability distribution for one or more actions available at a time period using the policy function. In some cases, the operations of this step may be performed by a selection component as described with reference to FIG. 8. At operation 320, the system selects an action for the time period based on the probability distribution. In some cases, the operations of this step may be performed by a selection component as described with reference to FIG. 8. Further detail regarding the probability distribution and the action selection is provided with reference to FIG. 6.

Figure 4:
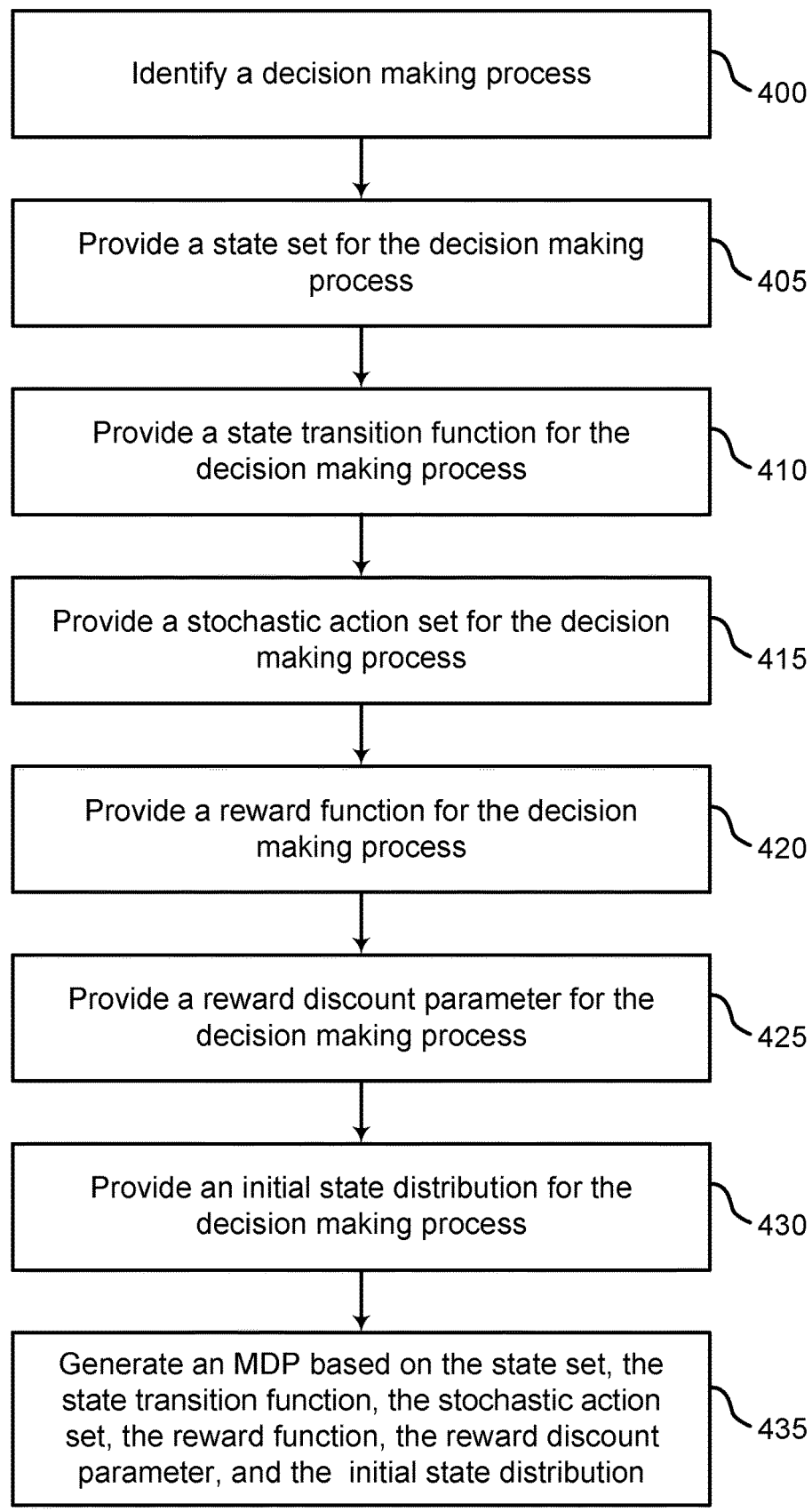
FIG. 4 shows an example of a process for generating a Markov decision process (MDP) according to aspects of the present disclosure.

FIG. 4 shows an example of a process for generating an MDP according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described according to aspects of the present disclosure. For example, the operations may be composed of various substeps, or may be performed in conjunction with other operations described herein.

At operation 400, the system identifies a decision-making process. In some cases, the operations of this step may be performed by an MDP component as described with reference to FIG. 8.

For example, the decision-making process may involve vehicle route planning and the stochastic availability is based at least in part on routing availability. In another example, the decision-making process may involve selecting an advertisement, and the stochastic availability is based on advertisement availability. In another example, the decision-making process may involve a robot control mechanism, and the stochastic availability is based on actuator movement availability. In another example, the decision-making process may involve a product recommendation system, and the stochastic availability is based at least in part on product availability.

At operation 405, the system provides a state set for the decision-making process. In some cases, the operations of this step may be performed by an MDP component as described with reference to FIG. 8. The state set may include the location and position of a vehicle or robot, or search parameters and profile parameters of someone viewing an advertisement or a product.

At operation 410, the system provides a state transition function for the decision-making process. In some cases, the operations of this step may be performed by an MDP component as described with reference to FIG. 8. The state transition function may represent, for example, how actions of a vehicle or robot change the position and location. Or alternatively, the state transition function may represent how viewing an advertisement or product may change the behavior of someone viewing that ad or product.

At operation 415, the system provides a stochastic action set for the decision-making process. In some cases, the operations of this step may be performed by an MDP component as described with reference to FIG. 8. The action set may be provided using sensors or datasets representing which actions of the action set are available at any given time. For example, in a vehicle navigation scenario, the system may transmit a request to a traffic database indicating which roads are open (or which directions include roads). As another example, a database may include which products are available for recommendation, or which robotic actuators are available for movement.

At operation 420, the system provides a reward function for the decision-making process. In some cases, the operations of this step may be performed by an MDP component as described with reference to FIG. 8. The reward function may include, for example, a function providing a positive reward once an objective is achieved (i.e., a vehicle reaching a destination) and a penalty at each time period (i.e., to encourage the system to provide a fast route to the destination).

At operation 425, the system provides a reward discount parameter for the decision-making process. In some cases, the operations of this step may be performed by an MDP component as described with reference to FIG. 8. The discount parameter may represent how rewards are discounted in the future, and may be a predetermined parameter of the system. In some cases, there is no discount.

At operation 430, the system provides an initial state distribution for the decision-making process. In some cases, the operations of this step may be performed by an MDP component as described with reference to FIG. 8. The initial state distribution provides an indication of the initial state conditions (i.e., the location of a vehicle, or the position of robotic actuators). The initial state distribution may be provided by a model of external circumstances, or via sensors or a database of conditions.

At operation 435, the system generates an MDP based on the state set, the state transition function, the stochastic action set, the reward function, the reward discount parameter, and the initial state distribution. In some cases, the operations of this step may be performed by an MDP component as described with reference to FIG. 8.

Figure 5:
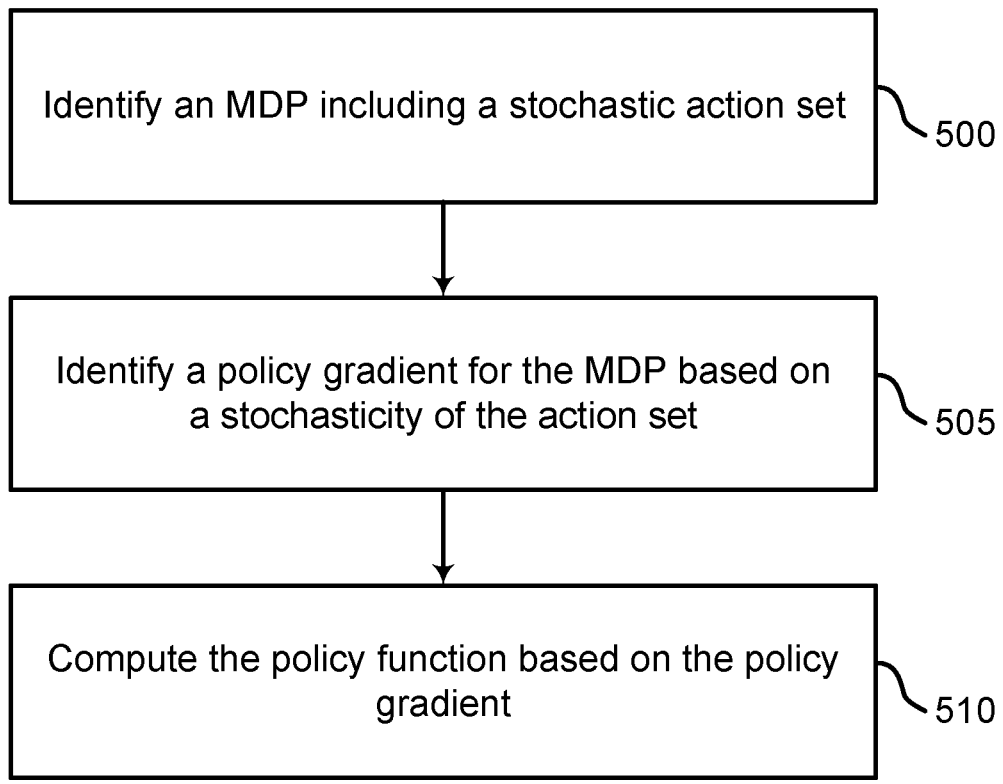
FIG. 5 shows an example of a process for computing a policy function according to aspects of the present disclosure.

FIG. 5 shows an example of a process for computing a policy function according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described according to aspects of the present disclosure. For example, the operations may be composed of various substeps, or may be performed in conjunction with other operations described herein.

At operation 500, the system identifies an MDP including a stochastic action set. In some cases, the operations of this step may be performed by a policy component as described with reference to FIG. 8. The MDP may be provided as described with reference to FIG. 4.

At operation 505, the system identifies a policy gradient for the MDP based on a stochasticity of the action set. In some cases, the operations of this step may be performed by a policy component as described with reference to FIG. 8. For example, the policy function may be determined based on the policy gradient given by Eq. 4. In some cases, the policy gradient is a natural policy gradient that measures distances between policies using notions of distance between probability distributions (e.g., using KLD).

At operation 510, the system computes the policy function based on the policy gradient. In some cases, the operations of this step may be performed by a policy component as described with reference to FIG. 8. The policy function may be a function that takes a current state and a set of available actions as input and provides a probability distribution over the set of available actions as output. The probability distribution indicates the likelihood that each of the available actions should be selected. In the deterministic case, the probability distribution provides a single action as a recommendation with probability one (i.e., 100% likely).

Example pseudo-code for the SAS policy gradient algorithm is provided in Algorithm as shown in FIG. 9.

Referring to FIG. 9, let the estimators of $v^\theta$ and $q^\theta$ be $\hat{v}^{\bar{\omega}}$ and $\hat{q}^\omega$, which are parameterized using $\bar{\omega}$ and $\omega$, respectively. Let $\pi^\theta$ correspond to the policy parameterized using $\theta$. The symbols $\eta_{\bar{\omega}}$; $\eta_\omega$, $\eta_\lambda$ and $\eta_\gamma$ represent the learning-rate hyper-parameters. Begin by initializing the $\lambda$ values to $-0.5$ each, such that it takes an average of both the baselines and subtracts it from the sampled return. In Line 3, a trajectory using $\pi^\theta$ is implemented, and transition samples are stored along with that action set available at each time step. The sampled return from states at each time step is computed in Line 4. Lines 6 and 7 correspond to the updates for parameters associated with $\hat{v}^{\bar{\omega}}$ and $\hat{q}^\omega$, using their corresponding TD errors.

The policy parameters are then updated by taking a weighted combination of both the baselines into consideration. In some cases, it may be appropriate to drop the $\gamma^t$ dependency for data efficiency. To automatically tune the values of $\lambda_1$ and $\lambda_2$, create the sample estimates of the matrices B and C using the transitions from batch $\mathbb{B}$, in Lines 9 and 10. To update the values of $\lambda$'s, first compute A using the sample estimates of $\mathbb{E}[B^T B]$ and $\mathbb{E}[B^T C]$. While computing the inverse, a small diagonal noise may be added to ensure that inverse exists. As everything is parameterized using a smooth function, the subsequent estimates of A should not vary significantly. If only sample estimates of A are available, leverage the Polyak-Rupert averaging in line 12 for stability.

An example pseudo-code for the SAS natural policy gradient is provided in Algorithm 2 as shown in FIG. 10.

Referring to FIG. 10, let the learning-rate for updating $\theta$ and w be given by $\eta_\theta$ and $\eta_w$, respectively. Similar to Algorithm 1, begin by collecting the transition batch $\mathbb{B}$ and compute the sampled returns from each state in Lines 2 and 3. Update the parameter w in Line 5 to minimize the associated TD error. The updated parameter w is then used to update the policy parameter $\theta$. As dividing by a scalar does not change the direction of the (natural) gradient, normalize the update using norm of w in Line 6 for better stability.

Figure 6:
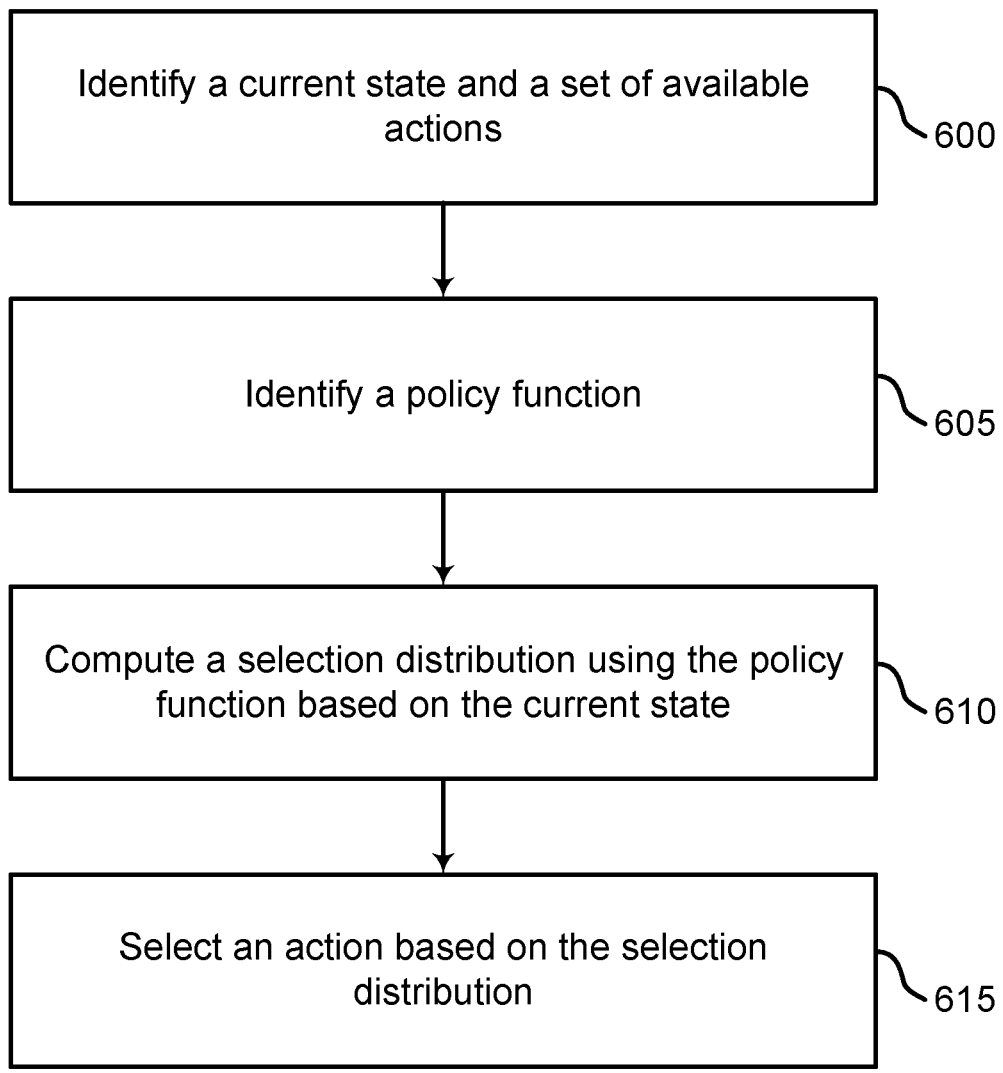
FIG. 6 shows an example of a process for selecting an action according to aspects of the present disclosure.

FIG. 6 shows an example of a process for selecting an action according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described according to aspects of the present disclosure. For example, the operations may be composed of various substeps, or may be performed in conjunction with other operations described herein.

At operation 600, the system identifies a current state and a set of available actions. In some cases, the operations of this step may be performed by a selection component as described with reference to FIG. 8. The state may refer to, for example, the location of a vehicle, the position of a robot, the profile and searching parameters of an advertisement viewer, or parameters related to the sale of a product. The set of available actions may refer to available paths for a vehicle, available actuator movements for a robot, available advertisements, or available products for sale. In some examples, this information is input to the system from external sensors or an external database. In other examples, the information is received from an integrated source of available actions.

At operation 605, the system identifies a policy function. In some cases, the operations of this step may be performed by a selection component as described with reference to FIG. 8. The policy function may be determined according to the methods described with reference to FIG. 1 and FIG. 5.

At operation 610, the system computes a selection distribution using the policy function based on the current state. In some cases, the operations of this step may be performed by a selection component as described with reference to FIG. 8. To compute the selection distribution function, the current state is input to the policy function along with the set of available actions. The selection distribution is the output of the policy function and represents a probability distribution across the set of available actions. The selection distribution may be normalized so that the sum of the values is equal to one.

At operation 615, the system selects an action based on the selection distribution. In some cases, the operations of this step may be performed by a selection component as described with reference to FIG. 8. In some cases, the selection comprises a probabilistic selection of an action, where the probability of selecting any action is equal to the weight associated with that action in the selection distribution. For example, if the set of available actions includes two actions, $a_1$ and $a_2$, each of which is associated with a weight of 0.5 in the selection distribution, then each of these actions has an equal probability of being selected. In some cases, the action is selected using a random or pseudo-random number generator.

Figure 7:
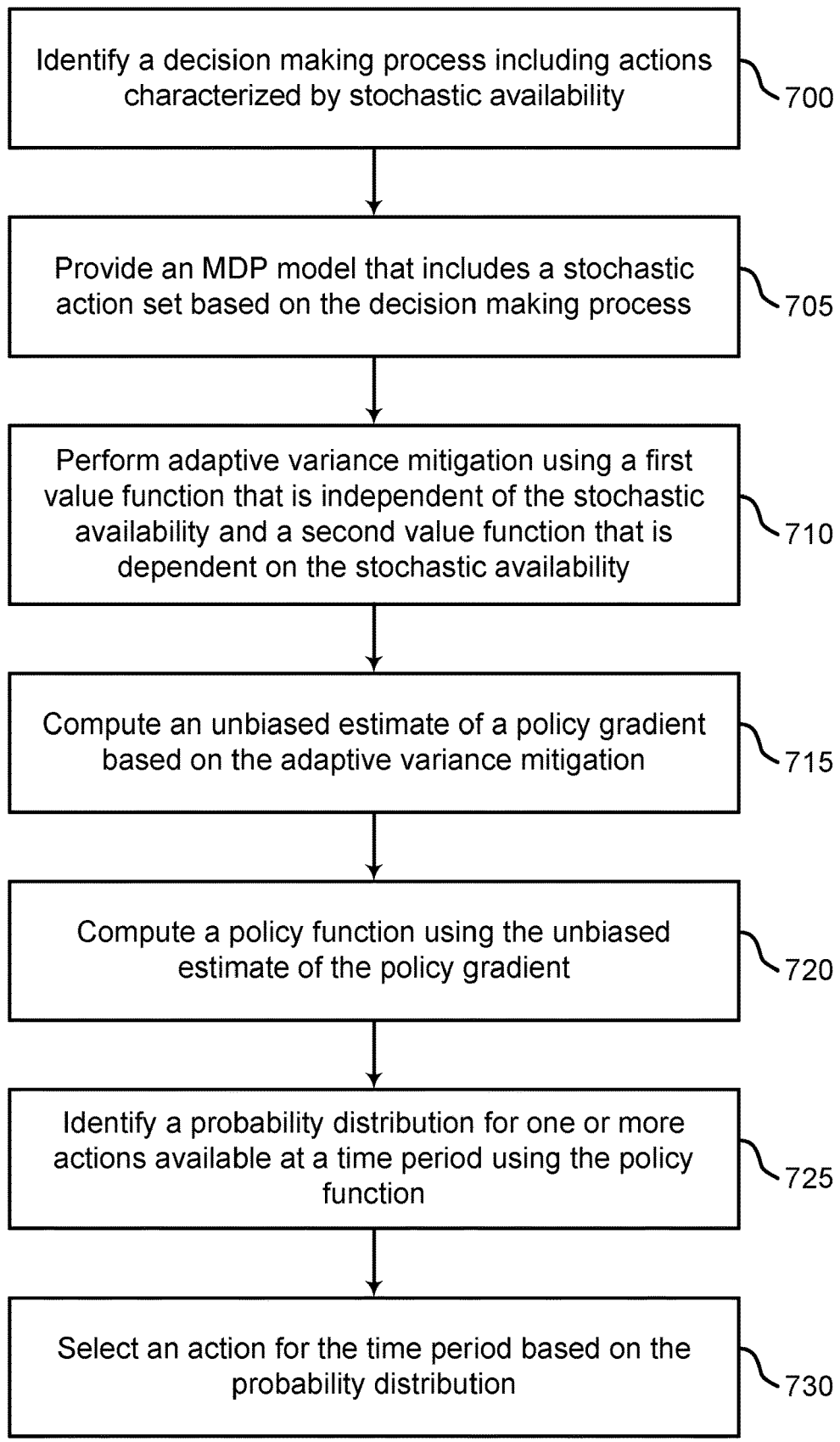
FIG. 7 shows an example of a process for computing an unbiased estimate according to aspects of the present disclosure.

FIG. 7 shows an example of a process for computing an unbiased estimate according to aspects of the present disclosure. In some examples, these operations may be performed by a system including a processor executing a set of codes to control functional elements of an apparatus. Additionally, or alternatively, the processes may be performed using special-purpose hardware. Generally, these operations may be performed according to the methods and processes described according to aspects of the present disclosure. For example, the operations may be composed of various substeps, or may be performed in conjunction with other operations described herein.

At operation 700, the system identifies a decision-making process including actions characterized by stochastic availability. At operation 705, the system provides an MDP model that includes a stochastic action set based on the decision-making process. In some cases, the operations of steps 700 and 705 may be performed by an MDP component as described with reference to FIG. 8. Further detail regarding these steps is provided with reference to FIG. 4.

At operation 710, the system performs adaptive variance mitigation using a first value function that is independent of the stochastic availability and a second value function that is dependent on the stochastic availability. At operation 715, the system computes an unbiased estimate of a policy gradient based on the adaptive variance mitigation. In some cases, the operations of steps 710 and 715 may be performed by a policy component as described with reference to FIG. 8.

While policy gradient algorithms for SAS-MDPs avoid the divergence of SAS-Q-learning, they may be subject to high variance. Due to the additional stochasticity that results from stochastic action sets, this problem can be substantial in the SAS-MDP setting. However, the Bellman equation for SAS-MDPs may be used to reduce the variance of policy gradient estimates.

One method to reduce variance is the use of a state-dependent baseline b(s). For any state-dependent baseline b(s):

$$\nabla J(\theta) = \mathbb{E}\left[\sum_{t=0}^{\infty} \gamma^t \psi^\theta(s,\alpha,a)(q^\theta(s,a) - b(s))\right]. \quad (\text{Eq. 7})$$

For any random variables X and Y, the variance of X−Y is given by:

$$\text{var}(X-Y) = \text{var}(X) + \text{var}(Y) - 2\,\text{cov}(X,Y), \quad (\text{Eq. 8})$$

where cov stands for covariance is known. Therefore, the variance of X−Y is less than the variance of X if $2\text{cov}(X,Y) > \text{var}(Y)$. As a result, any state dependent baseline b(s) whose value is sufficiently correlated to the expected return, $q^\theta(s, a)$, can be used to reduce the variance of the sample estimator. One choice for such a baseline is a state-value function estimator, v(s) (i.e., the first value function independent of the stochasticity).

A baseline dependent on both the state and action can have higher correlation with $q^\theta(s, a)$, and could therefore reduce variance further. However, some such action dependent baselines may be unsuitable, as they can result in biased gradient estimates.

Embodiments of the present disclosure utilize a baseline for SAS-MDPs that lies between state-dependent and state-action-dependent baselines. Like state-dependent baselines, these baselines do not introduce bias into gradient estimates. However, like action-dependent baselines, they include some information about the chosen actions. Specifically, baselines that depend on the state, $S_t$, and available action set $A_t$, but not the precise action, $A_t$, are proposed.

The SAS Bellman equation says that the state-value function for SAS-MDPs can be written as, $$v^\theta(s) = \Sigma_{\alpha \in 2^{\mathcal{E}}} \varphi(s,\alpha) \Sigma_{a \in \alpha} \pi^\theta(s,\alpha,a) q^\theta(s,a). \quad (\text{Eq. 9})$$

Use of a baseline dependent on the action sampled from re is not directly used in this example. Rather, a baseline dependent on the sampled action set is used. For example, embodiments of the present disclosure may utilize a baseline which leverages this information about the sampled action set α. This baseline (i.e., the second value function that depends on the stochasticity) is given by:

$$\bar{q}(s,\alpha) := \Sigma_{a \in \alpha} \pi^\theta(s,\alpha,a)\hat{q}(s,a), \quad (\text{Eq. 10})$$

where $\hat{q}$ is a learned estimator of the state-action value function, and $\bar{q}$ represents its expected value under the current policy, $\theta^\pi$, conditioned on the sampled action set α.

In principle, $\bar{q}(S_t, A_t)$ may be correlated with $q^\theta(S_t, A_t)$, as it explicitly depends on the action set and does not compute an average over all actions sets possible. Practically, however, estimating q values can be harder than estimating v. This may be due to the fact that with the same number of training samples, the number of parameters to learn in $\hat{q}$ may be more than those in an estimate of $v^\theta$. Using a weighted combination of $\hat{v}(S_t)$ and $\bar{q}(S_t, A_t)$ (i.e., the first and second value functions) may provide a suitable combination. In fact, using any weighted combination of these two baselines results in an unbiased estimate of the SAS policy gradient (i.e., adaptive variance mitigation).

That is, for $$\hat{J}(s,\alpha,a,\theta) := \psi^\theta(s,\alpha,a)(q^\theta(s,a) + \lambda_1 \hat{v}(s) + \lambda_2 \bar{q}(s,\alpha)), \text{ and} \quad (\text{Eq. 11})$$

$$d^\pi(s) := \Sigma_t^\infty \gamma^t Pr(S_t = s), \quad (\text{Eq. 12})$$

then for any values of $\lambda_1 \in \mathbb{R}$ and $\lambda_2 \in \mathbb{R}$, $$\nabla J(\theta_t) = \mathbb{E}[\hat{J}(s,\alpha,a,\theta) d^\pi, \varphi, \pi]. \quad (\text{Eq. 13})$$

However, this result does not specify what values of $\lambda_1$ and $\lambda_2$ should be used for combining $\hat{v}$ and $\bar{q}$. In some cases these may be left as hyperparameters. In other embodiments, a method for automatically adapting $A = \lambda_1, \lambda_2$ for the specific SAS-MDP and current policy parameters may be used. The following is an analytic expression for the value of A that minimizes a sample-based estimate of the variance of $\hat{J}$.

If $A = [\lambda_1, \lambda_2]^T$, $B = \psi^\theta(s, \alpha, a)\hat{v}(s), \psi^\theta(s, \alpha, a)\bar{q}(s, \alpha)^T$ and $C = [\psi^\theta(s, \alpha, a)q^\theta(s, \alpha)]^T$, where $A \in \mathbb{R}^{2 \times 1}$, $B \in \mathbb{R}^{d \times 2}$, and $C \in \mathbb{R}^{d \times 1}$, then the A that minimizes the variance of $\hat{J}$ is given by:

$$A = -(\mathbb{E}[B^T B])^{-1} \mathbb{E}\,\mathbb{E}[B^T C]] \quad (\text{Eq. 9})$$

This result provides the values for $\lambda_1$ and $\lambda_2$ that result in the minimal variance of $\hat{J}$. The computational cost associated with evaluating the inverse of $\mathbb{E}[B^T B]$ is negligible because its dimension is always $\mathbb{R}^{2 \times 2}$, independent of the number of policy parameters. Also, the optimal values of $\lambda_1$ and $\lambda_2$ may be approximated using sample-based estimates of B and C. Furthermore, a double sampling may be used for B to get unbiased estimates of the variance minimizing the value of A. However, as the unbiased estimator ensures that estimates of $\hat{J}$ for any value of $\lambda_1$ and $\lambda_2$ are always unbiased, all the available samples for estimating $\mathbb{E}[B^T B]$ and $\mathbb{E}[B^T C]$ are used.

At operation 720, the system computes a policy function for the MDP model using the policy gradient based on a function representing a stochasticity of the stochastic action set. In some cases, the operations of this step may be performed by a policy component as described with reference to FIG. 8. Further detail regarding this step is provided with reference to FIG. 5.

At operation 725, the system identifies a probability distribution for one or more actions available at a time period using the policy function. At operation 730, the system selects an action for the time period based on the probability distribution. In some cases, the operations of steps 725 and 730 may be performed by a selection component as described with reference to FIG. 8. Further detail regarding these steps is provided with reference to FIG. 6.

Figure 8:
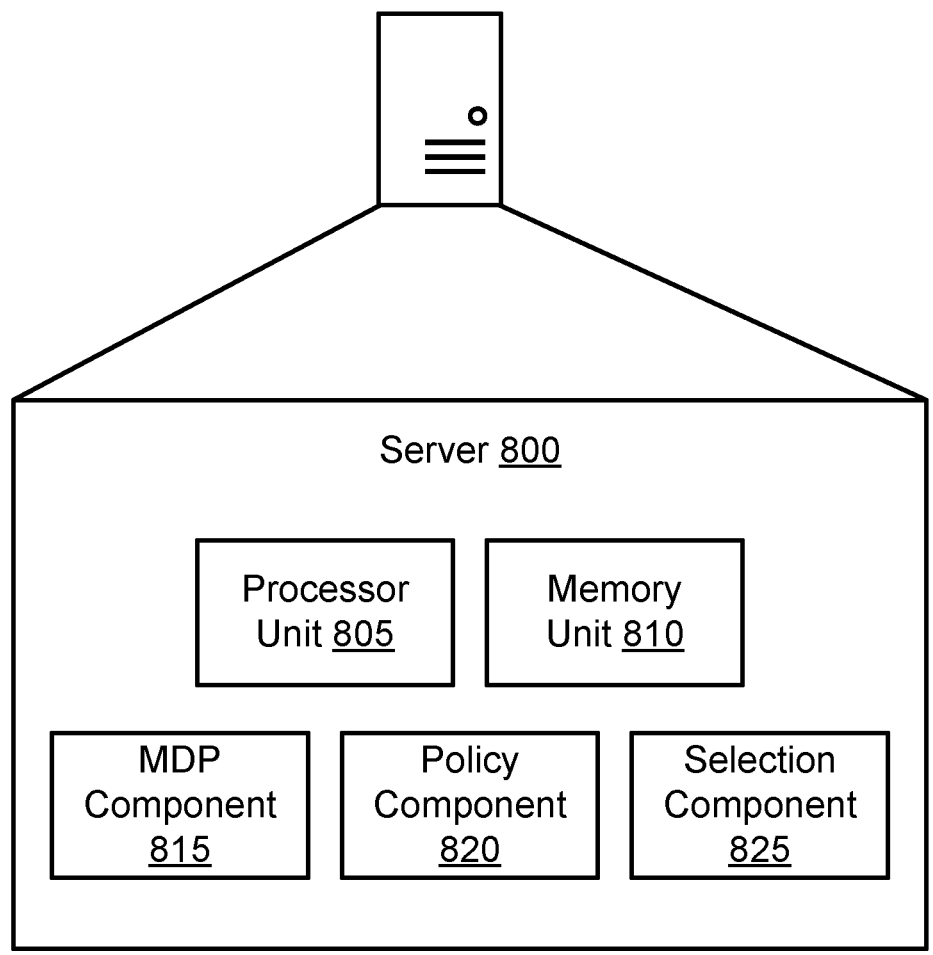
FIG. 8 shows an example of a sequential decision-making apparatus according to aspects of the present disclosure.

FIG. 8 shows an example of a sequential decision-making apparatus according to aspects of the present disclosure. Server 800 may be an example of, or include aspects of, the corresponding element or elements described with reference to FIG. 1. Server 800 may include processor unit 805, memory unit 810, MDP component 815, policy component 820, and selection component 825.

A processor unit 805 may include an intelligent hardware device, (e.g., a general-purpose processing component, a digital signal processor (DSP), a central processing unit (CPU), a graphics processing unit (GPU), a microcontroller, an application-specific integrated circuit (ASIC), a field-programmable gate array (FPGA), a programmable logic device, a discrete gate or transistor logic component, a discrete hardware component, or any combination thereof). In some cases, the processor may be configured to operate a memory array using a memory controller. In other cases, a memory controller may be integrated into processor. The processor may be configured to execute computer-readable instructions stored in a memory to perform various functions.

A memory unit 810 may store information for various programs and applications on a computing device. For example, the storage may include data for running an operating system. The memory may include both volatile memory and non-volatile memory. Volatile memory may random access memory (RAM), and non-volatile memory may include read-only memory (ROM), flash memory, electrically erasable programmable read-only memory (EEPROM), digital tape, a hard disk drive (HDD), and a solid-state drive (SSD). Memory may include any combination of readable or writable volatile memories or non-volatile memories, along with other possible storage devices.

MDP component 815 may identify a decision-making process including actions characterized by stochastic availability. MDP component 815 may also provide an MDP model that includes a stochastic action set based on the decision-making process.

In some examples, the decision-making process includes vehicle route planning and the stochastic availability is based on routing availability. In some examples, the decision-making process includes selecting an advertisement, and the stochastic availability is based on advertisement availability. In some examples, the decision-making process includes a robot control mechanism, and the stochastic availability is based on actuator movement availability. In some examples, the decision-making process includes a product recommendation system, and the stochastic availability is based on product availability.

Policy component 820 may compute a policy function for the MDP model using a policy gradient based on a function representing stochasticity of the stochastic action set. In some examples, the policy gradient ensures asymptotic convergence to a local critical point. In some examples, the policy gradient is invariant with respect to how the policy is parameterized. In some examples, the policy gradient is based on a Kullback-Leibler divergence (KLD), a Bregman divergence, or any combination thereof. In some examples, the policy function is computed using a function approximator. In some examples, the function approximator includes a neural network.

Policy component 820 may also compute a fisher information matrix for the policy function based on the function representing stochasticity of the stochastic action set. Policy component 820 may also perform adaptive variance mitigation using a first value function that is independent of the stochastic availability and a second value function that is dependent on the stochastic availability. Policy component 820 may also compute an unbiased estimate of the policy gradient based on the adaptive variance mitigation.

In some examples, policy component 820 computes the policy gradient using an artificial neural network (ANN). An ANN may be a hardware or a software component that includes a number of connected nodes (a.k.a., artificial neurons), which may loosely correspond to the neurons in a human brain. Each connection, or edge, may transmit a signal from one node to another (like the physical synapses in a brain). When a node receives a signal, it can process the signal and then transmit the processed signal to other connected nodes. In some cases, the signals between nodes comprise real numbers, and the output of each node may be computed by a function of the sum of its inputs. Each node and edge may be associated with one or more node weights that determine how the signal is processed and transmitted. During the training process, these weights may be adjusted to improve the accuracy of the result (i.e., by minimizing a loss function which corresponds in some way to the difference between the current result and the target result). The weight of an edge may increase or decrease the strength of the signal transmitted between nodes. In some cases, nodes may have a threshold below which a signal is not transmitted at all. The nodes may also be aggregated into layers. Different layers may perform different transformations on their inputs. The initial layer may be known as the input layer, and the last layer may be known as the output layer. In some cases, signals may traverse certain layers multiple times.

Selection component 825 may identify a probability distribution for one or more actions available at a time period using the policy function. Selection component 825 may also select an action for the time period based on the probability distribution.

Accordingly, the present disclosure includes the following embodiments.

A method for reinforcement learning with stochastic availability is described. Embodiments of the method may identifying a decision-making process including actions characterized by stochastic availability, providing an Markov decision process (MDP) model that includes a stochastic action set based on the decision-making process, computing a policy function for the MDP model using a policy gradient based at least in part on a function representing a stochasticity of the stochastic action set, identifying a probability distribution for one or more actions available at a time period using the policy function, and selecting an action for the time period based on the probability distribution.

An apparatus for decision-making is described. The apparatus may include a processor, memory in electronic communication with the processor, and instructions stored in the memory. The instructions may be operable to cause the processor to identify a decision-making process including actions characterized by stochastic availability, provide an MDP model that includes a stochastic action set based on the decision-making process, compute a policy function for the MDP model using a policy gradient based at least in part on a function representing a stochasticity of the stochastic action set, identify a probability distribution for one or more actions available at a time period using the policy function, and select an action for the time period based on the probability distribution.

A non-transitory computer-readable medium storing code for decision-making is described. In some examples, the code comprises instructions executable by a processor to: identify a decision-making process including actions characterized by stochastic availability, provide an MDP model that includes a stochastic action set based on the decision-making process, compute a policy function for the MDP model using a policy gradient based at least in part on a function representing a stochasticity of the stochastic action set, identify a probability distribution for one or more actions available at a time period using the policy function, and select an action for the time period based on the probability distribution.

In some examples, the policy function is computed using a function approximator. In some examples, the function approximator comprises a neural network. In some examples, the policy gradient ensures asymptotic convergence to a local critical point. In some examples, the policy gradient is invariant with respect to how the policy is parameterized. In some examples, the policy gradient is based on a Kullback-Leibler divergence (KLD), a Bregman divergence, or any combination thereof.

Some examples of the method, apparatus, and non-transitory computer-readable medium described above may further include computing a fisher information matrix for the policy function based at least in part on the function representing a stochasticity of the stochastic action set.

Some examples of the method, apparatus, and non-transitory computer-readable medium described above may further include performing adaptive variance mitigation using a first value function that is independent of the stochastic availability and a second value function that is dependent on the stochastic availability. Some examples may further include computing an unbiased estimate of the policy gradient based on the adaptive variance mitigation.

In some examples, the decision-making process comprises vehicle route planning and the stochastic availability is based at least in part on routing availability. In some examples, the decision-making process comprises selecting an advertisement and the stochastic availability is based on advertisement availability. In some examples, the decision-making process comprises a robot control mechanism and the stochastic availability is based on actuator movement availability. In some examples, the decision-making process comprises a product recommendation system and the stochastic availability is based at least in part on product availability.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also, the phrase "based on" is not used to represent a closed set of conditions. For example, a step that is described as "based on condition A" may be based on both condition A and condition B. In other words, the phrase "based on" shall be construed to mean "based at least in part on."

What is claimed is:

1. A method for decision-making, comprising:
identifying a decision-making process including actions characterized by stochastic availability;
providing a Markov decision process (MDP) model that includes a stochastic action set based on the decision-making process;
computing a policy function for the MDP model using a policy gradient based at least in part on a stochasticity function characterizing a conditional distribution of the stochastic action set, wherein the policy function and the policy gradient are computed using a neural network, wherein a parameter of the policy function corresponds to a node weight of the neural network, and wherein the policy gradient represents a change in the parameter;
identifying a probability distribution for one or more actions available at a time period using the policy function; and
selecting an action for the time period based on the probability distribution.

2. The method of claim 1, wherein:
the policy gradient ensures asymptotic convergence to a local critical point.

3. The method of claim 1, wherein:
the policy gradient is invariant with respect to how the policy function is parameterized.

4. The method of claim 1, wherein:
the policy gradient is based on a Kullback-Leibler divergence (KLD), a Bregman divergence, or any combination thereof.

5. The method of claim 1, further comprising:
computing a fisher information matrix for the policy function based at least in part on the stochasticity function.

6. The method of claim 1, further comprising:
performing adaptive variance mitigation using a first value function that is independent of the stochastic availability and a second value function that is dependent on the stochastic availability; and
computing an unbiased estimate of the policy gradient based on the adaptive variance mitigation.

7. The method of claim 1, wherein:
the decision-making process comprises vehicle route planning and the stochastic availability is based at least in part on routing availability.

8. The method of claim 1, wherein:
the decision-making process comprises selecting an advertisement and the stochastic availability is based on advertisement availability.

9. The method of claim 1, wherein:
the decision-making process comprises a robot control mechanism and the stochastic availability is based on actuator movement availability.

10. The method of claim 1, wherein:
the decision-making process comprises a product recommendation system and the stochastic availability is based at least in part on product availability.

11. An apparatus for decision-making, comprising:
a processor and a memory storing instructions and in electronic communication with the processor, the processor being configured to execute the instructions to:
compute a policy function for a Markov decision process (MDP) model using a policy gradient based at least in part on a stochasticity function characterizing a conditional distribution of a stochastic action set, wherein the policy function and the policy gradient are computed using a neural network, wherein a parameter of the policy function corresponds to a node weight of the neural network, and wherein the policy gradient represents a change in the parameter;
receive a first available action set for the MDP model for a first time period;
select a first action set for the first time period using the policy function based on the first available action set;
receive a second available action set for the MDP model for a second time period, wherein the second available action is not equal to the first available action set; and
select a second action for the second time period using the policy function based on the second available action set.

12. The apparatus of claim 11, wherein:
the first available action set and the second available action set are both subsets of the stochastic action set.

13. The apparatus of claim 11, wherein:
the policy gradient ensures asymptotic convergence to a local critical point.

14. The apparatus of claim 11, wherein:
the policy gradient is invariant with respect to how the policy function is parameterized.

15. The apparatus of claim 11, wherein:
the policy gradient is based on a Kullback-Leibler divergence (KLD), a Bregman divergence, or any combination thereof.

16. The apparatus of claim 11, the processor being further configured to execute the instructions to:
compute a fisher information matrix for the policy function based at least in part on the stochasticity function.

17. The apparatus of claim 11, the processor being further configured to execute the instructions to:
perform adaptive variance mitigation using a first value function that is independent of a stochastic availability and a second value function that is dependent on the stochastic availability; and
compute an unbiased estimate of the policy gradient based on the adaptive variance mitigation.

18. A non-transitory computer-readable medium storing code for decision-making, the code comprising instructions executable by a processor to:
provide a Markov decision process (MDP) model that includes a stochastic action set;
perform adaptive variance mitigation using a first baseline function that is independent of a stochasticity of the stochastic action set and a second baseline that is dependent on the stochasticity;
compute an unbiased estimate of a policy gradient based on the adaptive variance mitigation;
compute a policy function based on the unbiased estimate of the policy gradient using a stochasticity function characterizing a conditional distribution of the stochastic action set, wherein the policy function and the unbiased estimate of the policy gradient are computed using a neural network, wherein a parameter of the policy function corresponds to a node weight of the neural network, and wherein the unbiased estimate of the policy gradient represents a change in the parameter; and
select an action based on the policy function.

* * * * *